J. SMITH.
CHEESE CUTTER.
APPLICATION FILED MAR. 9, 1908.
915,234.
Patented Mar. 16, 1909.
3 SHEETS—SHEET 1.
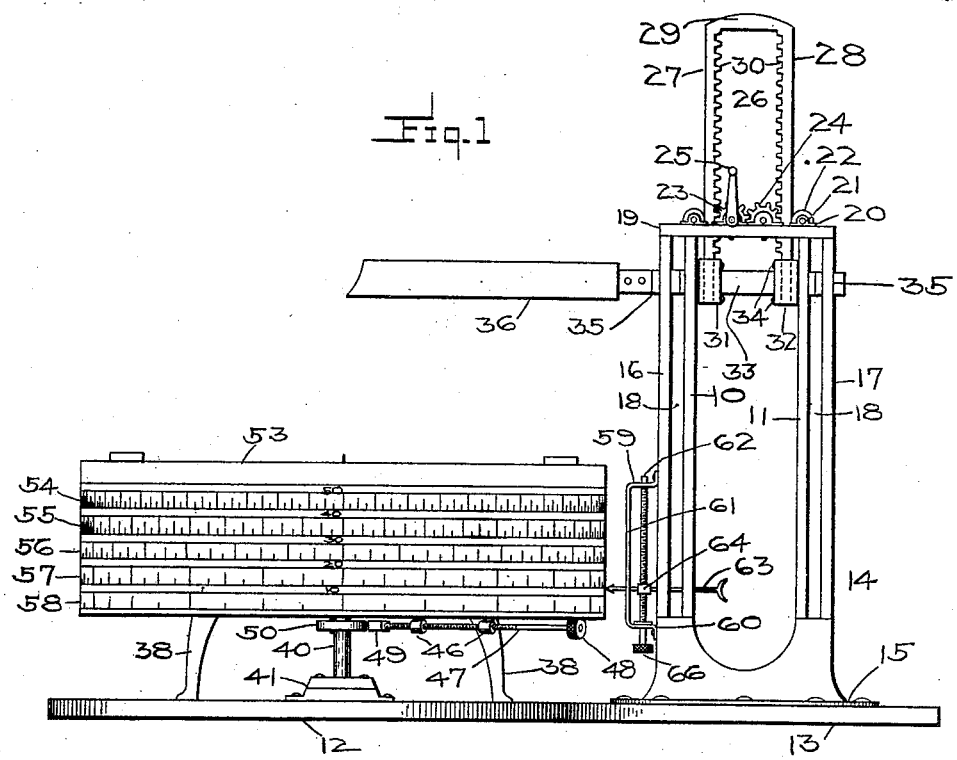
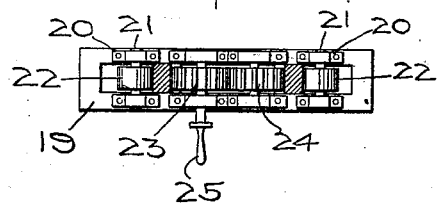
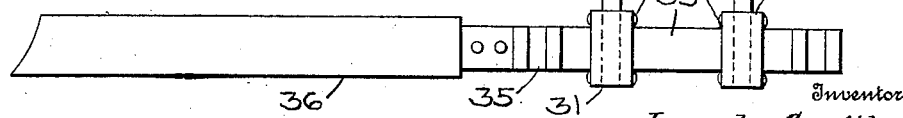
Witnesses
Edwin R. Lusby
E. L. Chandlee
Inventor
Joseph Smith.
By Woodward & Chandlee
Attorneys

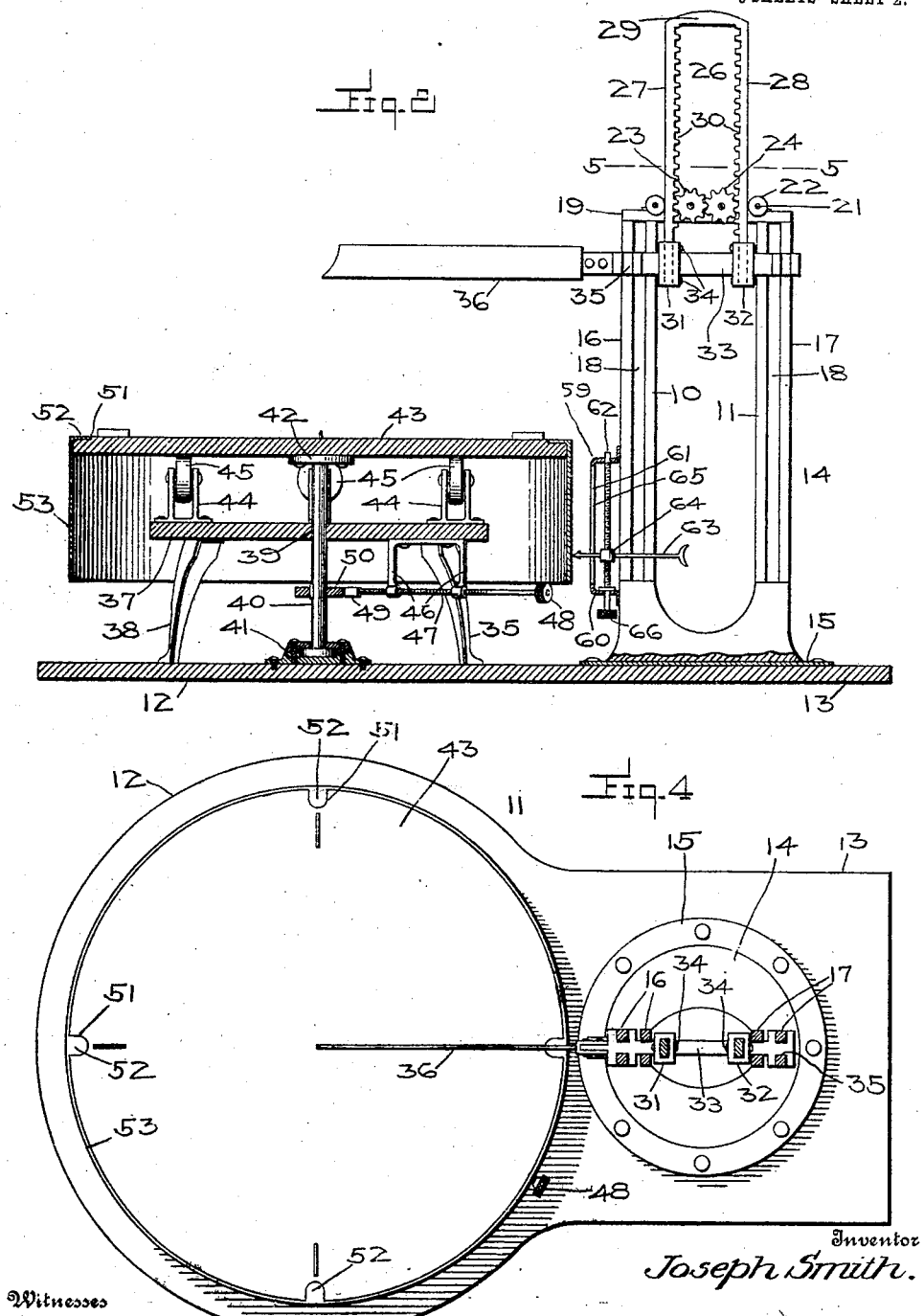

J. SMITH.
CHEESE CUTTER.
APPLICATION FILED MAR. 9, 1908.

915,234.

Patented Mar. 16, 1909.
3 SHEETS—SHEET 3.

Witnesses
Edwin R. Lusby.
E. L. Chandler.

Inventor
Joseph Smith,
By Woodward & Chandler
Attorneys

UNITED STATES PATENT OFFICE.

JOSEPH SMITH, OF CAMDEN, NEW JERSEY.

CHEESE-CUTTER.

No. 915,234.  Specification of Letters Patent.  Patented March 16, 1909.

Application filed March 9, 1908. Serial No. 419,949.

*To all whom it may concern:*

Be it known that I, JOSEPH SMITH, a citizen of the United States, residing at Camden, in the county of Camden and State of New Jersey, have invented certain new and useful Improvements in Cheese-Cutters, of which the following is a specification.

This invention relates to cheese cutters and more particularly to those known as computing cutters, and has for an object to provide a simple and inexpensive machine of this character which will enable a predetermined amount of cheese to be accurately cut.

Other objects and advantages will be apparent from the following description and it will be understood that changes in the specific structure shown and described may be made within the scope of the claims without departing from the spirit of the invention.

Figure 6:
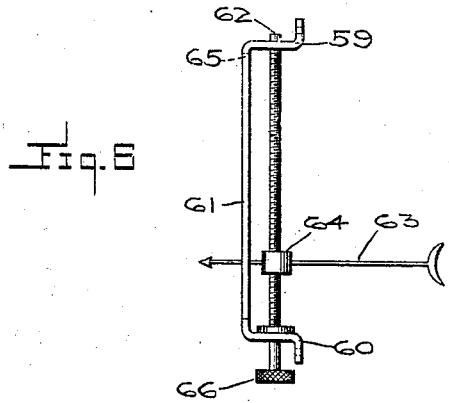
Figure 7:
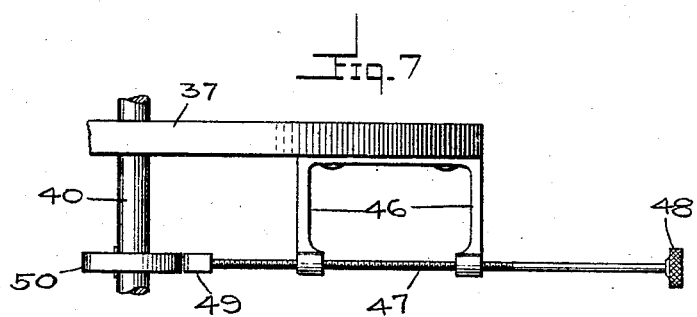
Figure 8:
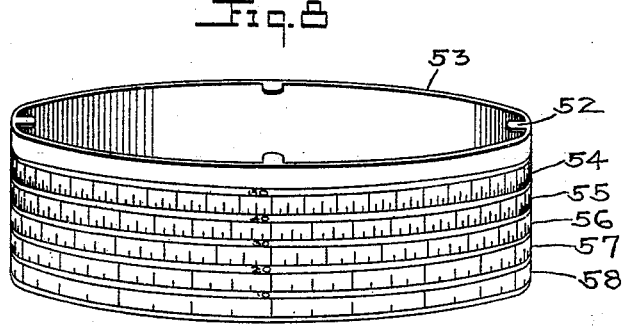

In the drawings forming a part of this specification, and in which like numerals of reference indicate similar parts in the several views, Figure 1 is a side view of the present cheese cutter, Fig. 2 is a transverse sectional view through the same, with portions broken away. Fig. 3 is an enlarged side elevational view of the cutting knife and connected rack yoke, Fig. 4 is a horizontal sectional view, Fig. 5 is a horizontal sectional view on the line 5—5 of Fig. 2, Fig. 6 is an enlarged detached detail view of the pointer, Fig. 7 is an enlarged detached side view of the brake mechanism, Fig. 8 is a perspective view of the scale band.

Referring now more particularly to the drawings, there is shown a cheese cutter comprising a supporting base plate having a circular portion 12 and a square laterally extending portion 13. Located upon the portion 13 of the base plate, are two similar brackets marked collectively 14, each comprising four standards disposed in sets of twos, and marked 16 and 17 and 10 and 11, respectively. These standards project from a base member 15 secured in a suitable manner to the portion 13. These vertically disposed spaced standards provide the guideways as shown at 18. The standards are all connected at their upper ends by means of the top frame 19, as shown in Fig. 5. This frame 19 adjacent to its ends is provided with bearing boxes 20 arranged to receive the trunnions 21 of wheels 22 which are revoluble between the frame bars 19, as shown. The frame 19 is provided with co-engaging gear wheels 23 and 24 which are also journaled in suitable bearing boxes carried by the bars 19. The gear wheel 23 is provided with a crank 25 for a purpose to be hereinafter described.

A vertically movable rack yoke 26 is guided between the bracket 14 and comprises spaced rack bars 27 and 28 connected at their upper ends by a cross rod 29. The bars 27 and 28 are each provided with the transversely extending rack teeth 30 upon their inner edges, and these rack bars 27 and 28 are thus engaged with the gear wheels 23 and 24 respectively. The outer faces of the bars are engaged with the guide wheels 22. The bars 27 and 28 at their lower ends are secured within the sockets 31 and 32 forming a portion of the knife bar 33. The rack bars are secured within the sockets by means of the set screws 34, the horizontally disposed knife bar being provided with the guide ways 35, to engage the outer standards 16 and 17, as shown in Fig. 2. Suitably secured to the bar 33, is the knife 36. It will thus be seen that upon rotation of the gear wheel 23, the gear 24 will be operated and by reason of the engagement with these wheels with the rack bars 27 and 28 the knife 36 can be moved in a vertical plane.

Located adjacent the brackets 14, is a circular supporting plate 37, having legs 38 secured to the portion 12 of the base plate. It will thus be seen that the supporting plate 37 is spaced from the circular portion of the base plate. The plate 37 is provided at its center with a vertically disposed passage 39, and revolubly disposed within this passage is a shaft 40, journaled at its lower end in a bearing box 41, carried by the base plate and located beneath the plate 37. The upper end of the shaft is provided with a flange 42, and secured to this flange, is a circular bed plate 43. The supporting plate 37 is provided with a plurality of brackets 44 which are provided with the rollers 45 arranged to support the rotatable bed plate 43.

The supporting plate 37 is provided upon its under side with the depending arms 46 arranged to receive the revoluble screw shaft 47 provided upon its outer end with a hand wheel 48. The inner end of the horizontally disposed shaft 47 is provided with a friction head 49 arranged for frictional engagement with a friction disk 50 secured to the shaft 40 and thus serves as a brake or friction stop for the bed plate 43. It will be understood that the cheese is supported upon the revoluble bed plate 43. The bed plate 43 is provided with a plurality of oppositely disposed recesses 51 located adjacent the peripheral edge of the bed plate, and these recesses are thus arranged to receive the ears 52 carried by a graduated computing band 53. The band 53 is provided with the scales 54, 55, 56, 57, and 58, and these scales are divided into pounds, half pounds, quarter pounds etc. A slotted bar 61 having the securing ends 59 and 60 is secured to the brackets 14, as shown in Fig. 2. The ends 59 and 60 respectively receive the unthreaded ends of a vertically disposed adjusting screw 62 which carries a pointer 63 having a threaded portion 64 engaged with the threads of the screw. The pointer extends through the slot 65 of the bar 61, as disclosed in Fig. 2. The adjusting screw 62 is provided at its lower end with a hand wheel 66.

Assuming a twenty pound cheese to be supported upon the bed plate 43, the hand wheel 66 of the screw 62 is revolved to bring the pointer 63 into registration with the scale 57, and the amount to be cut is determined by revolving the bed plate 43 as is obvious. The friction head 49 carried by the rod 47 is engaged with the friction disk 50 for holding the bed plate from accidental movement. After the parts have been set as described, the crank 25 carried by the gear 23 is rotated whereby the gear wheel will engage the teeth of the bars 27 and 28 and cause the same to descend thus forcing the knife 36 through the cheese. As shown in Fig. 8, this cutter is provided with several scales so that cheese weighing ten, twenty, thirty, forty or fifty pounds may be properly cut into any desired slices of predetermined weight.

A cutter as herein set forth and described is simple, and conveniently serves to accurately cut the cheese into predetermined amounts.

As disclosed in Fig. 1 the enlarged transversely positioned guide forming sockets, slidably engage the inner bracket standards 10 and 11, and also assist in guiding and bracing the knife bar 33.

The bed plate is yieldingly held by means of the friction disk 50, and the screw shaft 47, and is manually operated. The degree of friction or tension can be nicely regulated by means of the screw shaft 47.

And having thus described my said invention, what I claim as new, and desire to secure by United States Letters Patent, is:—

1. In combination, a base plate, two upstanding brackets, a top frame carried by said brackets, a rack yoke slidably held within said top frame, two meshing pinions carried by said frame and engaging said rack yoke, a horizontal knife bar secured to the lower end of said yoke and being guided upon said brackets, means to actuate said pinions, a knife carried by said bar, a vertical revolubly held shaft, a suitably supported friction stop in engagement with said shaft, a bed plate secured to said shaft, a scale carried by said bed plate, and a vertically adjustable pointer held adjacent to said scale.

2. The combination in a cheese cutter, of the following instrumentalities to wit, two brackets, each comprising two outer and two inner standards, a knife bar slidably held between said brackets, a top frame connecting said standards, a rack yoke passing through said frame, said knife bar having enlarged transversely positioned portions forming sockets, the lower end of said rack yoke being secured within said sockets, meshing pinions carried by said top frame and engaging said rack yoke, and means to actuate said pinions.

3. The combination with a suitably held vertical shaft, of a bed plate carried by said shaft, a friction disk carried by said shaft, a horizontally disposed screw shaft, a friction head carried by said shaft and engaging said disk, a graduated band carried by said bed plate, a slotted bar having suitable bearing ends, a screw shaft held within said bearing ends, and a pointer carried upon said screw shaft and projecting through said slotted bar and terminating adjacent to said graduated band.

In testimony whereof I affix my signature, in presence of two witnesses.

JOSEPH SMITH.

Witnesses:
  JOHN GROMSEN,
  FRANK SINOPLY.